Jan. 16, 1968　　　C. O. DAVIDSON　　　3,363,278

LEAF BLOWING APPARATUS

Filed June 20, 1966

INVENTOR.
CLARENCE O. DAVIDSON
BY
Townsend and Townsend
ATTORNEYS 3,363,278
LEAF BLOWING APPARATUS
Clarence O. Davidson, Rte. 1, Box 905,
Lakeport, Calif. 95453
Filed June 20, 1966, Ser. No. 558,944
5 Claims. (Cl. 15—405)

This invention relates to apparatus for blowing leaves and like refuse from a ground surface preparatory to gathering walnuts or like articles from the surface.

In harvesting certain comestibles, such as walnuts, the comestibles when mature fall from or are shaken from the trees on which they grow and fall to a ground surface. A machine for gathering the comestible articles from the ground surface is then passed thereover. An exemplary gathering machine is described in my copending patent application, Ser. No. 350,778, filed Mar. 10, 1964 now Patent No. 3,308,613. Efficient gathering of the walnuts or the like is adversely affected by the presence on the ground surface of leaves, twigs and like refuse. The present invention provides an efficient, versatile and inexpensive blower for blowing away leaves and the like so that the relatively heavier walnuts can be efficiently gathered by apparatus of the type exemplified in the above-cited patent application.

An object of the present invention is to promote the progress of the useful arts by providing a portable blower apparatus that is readily controlled without unduly fatiguing the operator thereof. This object is achieved according to the present invention by supporting a frame or carriage for a fan at one end thereof on one or more wheels rotatively mounted on axles that are oriented to support the wheels obliquely of the normal to the blower reactive force. The other end of the carriage is supported on a caster adjacent which is mounted an obliquely extending operator's handle. Such handle is angularly oriented relative to the frame by a greater degree of obliqueness than that of the wheels on the opposite end of the frame so that part of the force applied by the operator axially of the handle moves the apparatus forwardly over a ground surface and part of the force counteracts the twisting tendency caused by the reactive force of the blower.

Another object of this invention is to provide blowing apparatus that is simple of control in its movement over a ground surface. This object is accomplished by providing a fixed wheel and a pivotable wheel for supporting the frame and by mounting the fan closer to the fixed wheel. The operator's hand grip is located adjacent the pivotable wheel and is spaced from the fixed wheel by an amount considerably in excess of the spacing between the fan and the fixed wheel. Thus, the lateral force necessary on the hand grip to guide the apparatus in a desired direction and to counteract the reactive force of the blower is reduced.

Still another object is to provide a blower apparatus that can be operated without endangering the safety of the operator. This object is achieved by mounting the operator's handle obliquely of the plane in which the blower or fan blade rotates and therefore out of the path of travel of any heavy objects such as stones and the like that might inadvertently be picked up by the blade. Operator safety is additionally enhanced by providing ground contacting supporting legs extending laterally of the center line of the apparatus that prevent the apparatus from tipping over should the operator inadvertently stumble.

Yet another object is to provide an apparatus for blowing leaves that is inexpensive to produce and substantially maintenance free in operation.

These and other objects will be more apparent after referring to the following specification and accompanying drawing in which.

Figure 3:
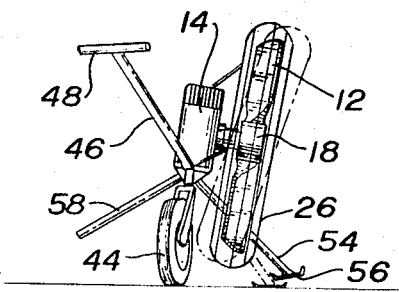
FIG. 3 is a rear elevation view of the apparatus at reduced scale.

Referring more particularly to the drawings, reference numeral 12 indicates a fan blade driven by an engine 14 which has a shaft 16 to which hub 18 of the blade is secured. As is conventional, a fuel tank 20 is provided for supplying fuel to the engine.

Engine 14 is mounted on an elongate frame member 22 which in one apparatus designed according to the invention is formed of box section structural steel. A plurality of brackets 24, 25 is secured rigidly of the frame for supporting a protective screen 26 in circumscribing relation to fan blade 12.

Figure 2:
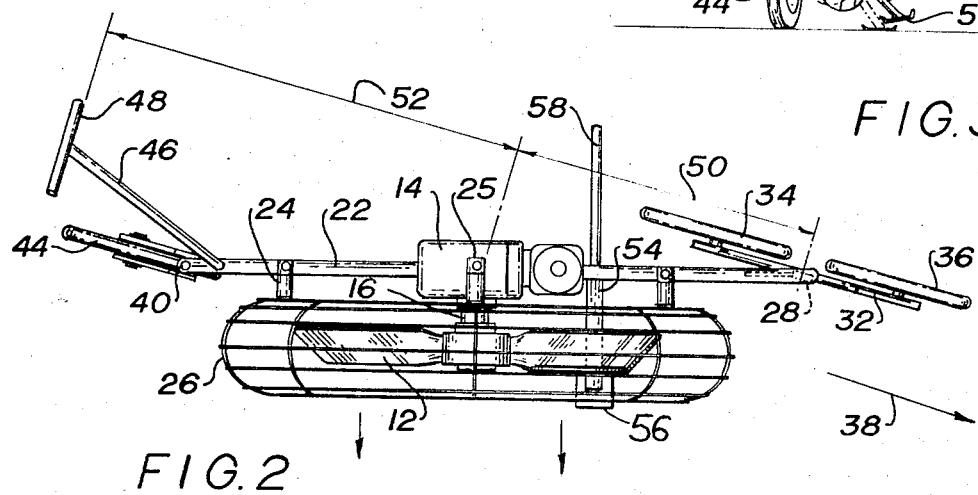
FIG. 2 is a top plan view of the apparatus of FIG. 1.

Secured to the forward end of frame member 22 for supporting the same in space relation to a ground surface S is a depending rigid bracket 28 on the bottom of which is pivotally connected at 30 a rocker arm 32. Mounted on opposite ends of rocker arm 32 are ground contacting wheels 34 and 36 which as can be seen most clearly in FIG. 2 are supported for rotation on axles that are oblique of the longitudinal axis of frame member 22 and parallel to the pivotal axis of connection 30. Such orientation of the wheels guides the apparatus in an angularly oriented direction relative to the plane in which blade 12 is rotatively driven by engine 14. This direction is indicated by arrow 38 which arrow is parallel to the plane containing wheels 34 and 36.

On the opposite end of frame member 22 is pivotally mounted at 40 an offset arm 42 at the lower end of which is rotatively mounted a wheel 44. Because arm 42 is offset and is pivotally mounted to the frame, wheel 44 constitutes a caster for steerably supporting the rear end of the frame.

Secured to frame 22 adjacent pivot connection 40 and extending upwardly and obliquely of the frame is a handle 46 having a handle bar 48 attached to the upper and outer end thereof. Handle 46 is of a length sufficient that handle bar 48 will be supported at convenient height for manual encirclement of the opposite ends of the handle bar by a standing or walking operator of the apparatus.

As can be seen most clearly from FIG. 2, handle 46 is angularly offset from the longitudinal axis of frame 22 so as to position handle bar 48 and the operator engaging the handle bar laterally of the plane in which fan 12 is rotated. The degree of obliqueness of handle 46, i.e., the angle as seen in FIG. 2 between the handle and frame 22, is greater than the degree of obliqueness of wheels 34, 36, i.e., the angle between the wheels and the frame, so that force axially of the handle at least partially counters the reactive force of the fan. Such orientation of handle 46 and handle bar 48 in conjunction with the oblique orientation of wheels 34 and 36 assures that the operator can safely control and propel the apparatus without liability to injury from any stones or the like picked up by blade 12.

Referring still to FIG. 2, the distance from pivot point 30, the effective connection between wheels 34 and 36 and frame 22, to the center line of shaft 16 is indicated at 50, and the distance from the center line of shaft 16 to handle bar 48 is indicated at 52. It will be noted that the dimension 50 is less than dimension 52. This relationship is important in reducing operator fatigue in that the force applied by the operator to handle bar 48 acts at a distance from pivot point 30 by an amount over twice the distance of the point of concentration of the reactive force of fan 12, which point of concentration coincides with the axis of shaft 16. In addition to the spacial relationship of the handle bar, shaft 16 and pivot point, the angular orientation of handle 46 also permits application of a vector of counter force in counter-reaction to the force of fan 12 when the operator applies counter force to the handle axially thereof in pushing the apparatus over the ground surface.

As shown in solid lines in FIG. 3, fan 12 preferably resides at an angle of approximately 10° of vertical when in operating position. Such angle directs the air produced by fan 12 downwardly and blows leaves and like refuse from the walnuts or like comestibles lying on the ground surface. In order to prevent the machine from tipping over or to prevent the blade from inadvertently contacting the ground surface, a first or front leg 54 is secured to frame 22 and has at the lower end thereof a ground contacting shoe 56. When shoe 56 is in contact with the ground surface as shown in broken lines in FIG. 3, the plane of blade 12 resides at an angle approximately 15–20° relative a vertical direction. A rear or second leg 58 is supported on frame 22 and extends in the opposite direction from leg 54.

In operation the apparatus is supported in a generally upright position by resting it on one of the legs 54, 58 so that fuel tank 20 can be filled and engine 14 started. The apparatus is then moved over a leaf-covered ground surface by manual engagement with handle bar 48. Because handle bar 48 is supported well above frame 22 by handle 46 the operator is able to adjust the angle of fan 12 relative a vertical direction to obtain optimum results. It has been found that an angle of approximately 10° with respect to vertical as shown in solid lines in FIG. 3, provides excellent results and such angle is easily maintained by the position of handle bar 48 in accordance with the present invention.

The apparatus is moved over the ground surface in a direction indicated by arrow 38 in FIG. 2. Without undue fatigue the operator can maintain such direction and steer the apparatus by application of lateral force to the handle bar because the lever arm about which such force is applied is much greater than the lever arm of the fan reactive force at shaft 16. Moreover, and as seen most clearly in FIG. 2, because handle 46 extends laterally from frame 22 at a greater degree of obliqueness than the direction of wheels 34 and 36, a part of the force applied by the operator axially of the handle is active in counteracting the reactive force of the fan.

Also, as shown most clearly in FIG. 2, the location of handle bar 48 remote from a plane described by blade 12 in its rotation assures that an operator engaging handle bar 48 is positioned outside of a radial path along which any stones or like heavy objects that are thrown out by blade 12.

Figure 1:
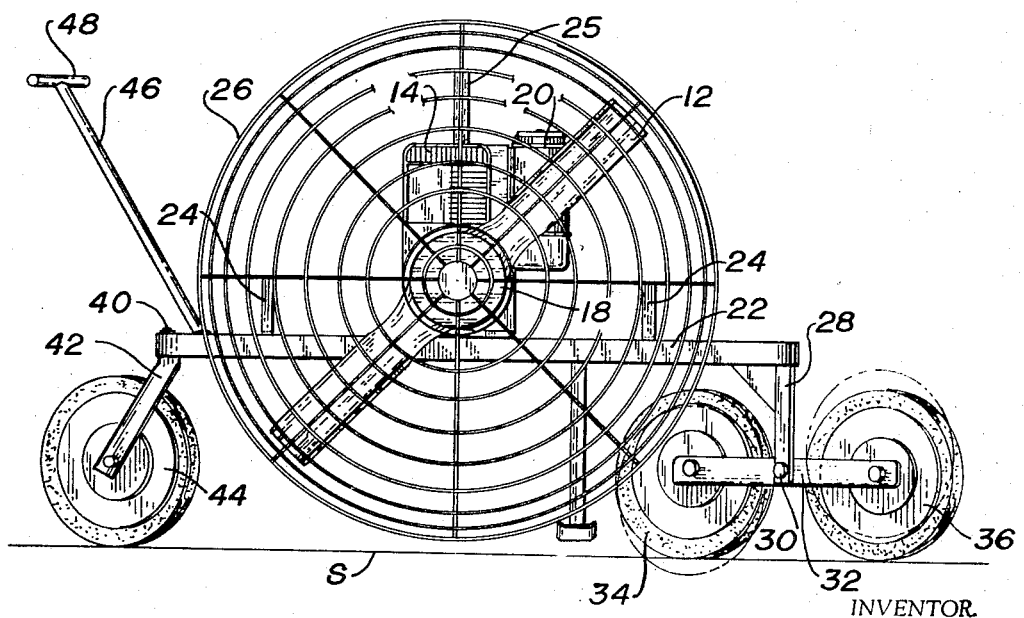
FIG. 1 is a side elevation view of a preferred form of the apparatus.

Ease of control of the apparatus by the operator is promoted by the provision of dual wheels 34 and 36 at the forward end of the frame 22. The presence of dual wheels successfully resists lateral force at the front of the apparatus that might otherwise result from the reactive force of the fan. In order to assure dual wheel contact at the front of the apparatus over rough or uneven terrain, pivotal connection 30 assures that both wheels will be in contact with the ground surface at all times. The broken lines in FIG. 1 indicate a position at which wheels 34 and 36 reside when an upwardly inclined grade is encountered by the apparatus.

Thus it will be seen that the present invention provides an extremely versatile, lightweight and easily controllable refuse blower which accomplishes its intended function without unduly fatiguing the operator thereof and without subjecting the operator to danger. The advantages of the invention are provided in an extremely uncomplex and inexpensive apparatus.

Although one embodiment of the invention has been shown and described it will be obvious that other adaptations and modifications can be made without departing from the true spirit and scope of the invention.

What is claimed is:

1. Apparatus for blowing leaves and like refuse from a ground surface comprising a fan blade, means for rotatively driving said fan blade to produce a forced air draft along a path generally normal to said blade, an elongate frame for supporting said blade driving means, said frame being elongated in a direction generally transverse to the air path produced by said fan, a wheel assembly for supporting one end of said frame in spaced relation above a ground surface, said wheel assembly including at least one wheel constrained for rotation in a plane obliquely oriented relative the longitudinal axis of said frame, a caster wheel mounted on the opposite end of said frame for supporting the opposite end in spaced relation above a ground surface, said caster wheel being pivotally joined to said frame for movement about a generally vertical axis, and a handle joined to said frame adjacent said caster wheel, said handle extending upwardly and obliquely of said frame so that the operator engaging said handle is positioned in laterally spaced relation to the plane in which said fan blade is rotatively driven.

2. The invention of claim 1 wherein said wheel assembly comprises a rocker arm having a first and second end, means for pivotally mounting said rocker arm to said frame intermediate said first and second ends, and first and second wheels rotatively joined to said rocker arm with respective said ends.

3. The invention of claim 1 wherein said fan driving means is mounted on said frame so that the distance from said driving means to said handle exceeds the distance from said driving means to said wheel assembly, whereby the force applied to the handle necessary for controlling said apparatus is reduced.

4. The invention of claim 1 in combination with a first leg rigidly connected to said frame and extending downwardly and transversely therefrom, said first leg having an outer end below said fan blade to prevent contact of said fan blade on the ground surface, and a second leg extending downwardly and transversely from said frame oppositely of said first leg for supporting said apparatus in a partially upright position.

5. The invention of claim 1 wherein the degree of obliqueness at which said handle extends from said frame exceeds the degree of obliqueness of the plane of said wheel assembly so that force applied by an operator axially of said handle includes a vector direction in counteraction to the reactive force of said fan on said frame.

References Cited

UNITED STATES PATENTS

| | | | |
|---|---|---|---|
| 1,932,137 | 10/1933 | Jinkerson | 15—340 |
| 1,987,582 | 1/1935 | Terrell | 15—405 |
| 2,635,920 | 4/1953 | Boyce | 230—258 |
| 2,929,749 | 3/1960 | Cochrane | 15—340 |

LAURENCE V. EFNER, *Primary Examiner.*